United States Patent
Eisele

(10) Patent No.: US 11,148,811 B1
(45) Date of Patent: Oct. 19, 2021

(54) ADJUSTABLE SEAT PAN ASSEMBLY FOR A SEAT

(71) Applicant: The Boeing Company, Chicago, IL (US)

(72) Inventor: Gregory Eisele, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/849,722

(22) Filed: Apr. 15, 2020

(51) Int. Cl.
*B64D 11/06* (2006.01)

(52) U.S. Cl.
CPC ........ *B64D 11/064* (2014.12); *B64D 11/0619* (2014.12)

(58) Field of Classification Search
CPC .......................... B64D 11/064; B64D 11/0619
USPC ...................................... 297/313, 344.15–17
See application file for complete search history.

(56) References Cited

U.S. PATENT DOCUMENTS

| | | | |
|---|---|---|---|
| 7,997,654 B2* | 8/2011 | Ferry | B64D 11/0646 297/342 |
| 8,403,415 B2 | 3/2013 | Lawson | |
| 8,579,375 B2 | 11/2013 | Marais et al. | |
| 8,888,181 B2* | 11/2014 | Perraut | 297/284.11 X |
| 9,067,512 B2 | 6/2015 | Cailleteau | |
| 9,452,838 B2 | 9/2016 | Meister et al. | |
| 10,232,744 B2 | 3/2019 | Meister et al. | |
| 2003/0025371 A1* | 2/2003 | Veneruso | 297/322 |
| 2017/0341752 A1 | 11/2017 | Verny et al. | |

FOREIGN PATENT DOCUMENTS

WO     2015040016     3/2015

* cited by examiner

*Primary Examiner* — Anthony D Barfield
(74) *Attorney, Agent, or Firm* — Kunzler Bean & Adamson

(57) ABSTRACT

Disclosed herein is an adjustable seat pan assembly for a seat. The seat pan assembly comprises a fixed frame comprising a frame front end and a frame read end. The seat pan assembly also comprises a seat pan positioned above the fixed frame and movably mounted to the fixed frame. The seat pan comprises a pan front end and a pan rear end. The seat pan assembly further comprises at least one actuator comprising a first end, attached to the seat pan, and a second end, attached to the fixed frame. The actuator is selectively operable to tilt the pan front end, relative to the pan rear end and the fixed frame, to adjust the angle of the seat pan relative to the fixed frame.

20 Claims, 6 Drawing Sheets

ADJUSTABLE SEAT PAN ASSEMBLY FOR A SEAT

FIELD

This disclosure relates generally to seats for mass-seating environments, and more particularly to an adjustable seat pan assembly, which can tilt at an upward angle, for a seat.

BACKGROUND

Seat pans of seats that are suitable for mass-seating environments, such as mass-transit seating (e.g., seats on an aircraft), are typically fixed or limited to forward-rearward articulation. A fixed seat pan or a forward-rearward moving seat pan does not prevent an occupant (e.g., passenger) from sliding forward in the seat along the seat pan, particularly when a seatback is in a reclined position. Forward sliding in the seat can lead to the occupant being in an uncomfortable recline position or demand frequent position self-correction by the occupant to push themselves back into the seat.

SUMMARY

The subject matter of the present application provides examples of seat pan assemblies, for passenger seats in a mass seating environment, and corresponding passenger seats that overcome the above-discussed shortcomings of prior art techniques. The subject matter of the present application has been developed in response to the present state of the art, and in particular, in response to shortcomings of conventional seat pan assemblies.

Disclosed herein is a seat pan assembly for a seat. The seat pan assembly comprises a fixed frame comprising a frame front end and frame rear end. The seat pan assembly also comprises a seat pan positioned above the fixed frame and movably mounted to the fixed frame. The seat pan comprises a pan front end and a pan rear end. The seat pan assembly further comprises at least one actuator comprising a first end, attached to the seat pan, and a second end, attached to the fixed frame. The at least one actuator is selectively operable to tilt the pan front end, relative to the pan rear end and the fixed frame, to adjust an angle of the seat pan relative to the fixed frame. The preceding subject matter of this paragraph characterizes example 1 of the present disclosure.

The seat pan is pivotably mounted to the fixed frame at a pivot axis. The pivot axis is parallel with a width of the seat pan. The pivot axis is closer to the pan rear end than the pan front end. The preceding subject matter of this paragraph characterizes example 2 of the present disclosure, wherein example 2 also includes the subject matter according to example 1, above.

The pivot axis at located at the pan rear end. The preceding subject matter of this paragraph characterizes example 3 of the present disclosure, wherein example 3 also includes the subject matter according to example 2, above.

The angle of the seat pan relative to the fixed frame is adjustable between a first position and a second position. The preceding subject matter of this paragraph characterizes example 4 of the present disclosure, wherein example 4 also includes the subject matter according to any one of examples 1-3, above.

The at least one actuator is selectively operable to tilt the pan front end, relative to the pan rear end and the fixed frame, to adjust the angle of the seat pan relative to the fixed frame to any angle between a first position and a second position. The preceding subject matter of this paragraph characterizes example 5 of the present disclosure, wherein example 5 also includes the subject matter according to any one of examples 1-4, above.

The at least one actuator is a pneumatic spring. The preceding subject matter of this paragraph characterizes example 6 of the present disclosure, wherein example 6 also includes the subject matter according to any one of examples 1-5, above.

The fixed frame comprises a left-side portion and a right-side portion. The left-side portion and the right-side portion extend parallel to each other from the frame front end to the frame rear end. The left-side portion is spaced apart from the right-side portion across a width of the seat pan. The preceding subject matter of this paragraph characterizes example 7 of the present disclosure, wherein example 7 also includes the subject matter according to any one of examples 1-6, above.

The seat pan assembly further comprises a first guide track in each of the left-side portion and the right-side portion of the fixed frame. The first guide track is closer to the frame front end of the fixed frame than the frame rear end. The first guide track extends at a downward angle from a first top end, in a direction towards the frame rear end, to a first bottom end. The seat pan is attached to the first guide track in the left-side portion and the first guide track in the right-side portion by a corresponding one of two mechanical followers configured to move along each one of the first guide tracks. The seat pan assembly also comprises a second guide track in each of the left-side portion and the right-side portion of the fixed frame. The second guide track is closer to the frame rear end than the frame front end. The second guide track extends at an upward angle from a second bottom end, in a direction towards the frame rear end, to a second top end. The seat pan is attached to the second guide track in the left-side portion and the second guide track in the right-side portion by a corresponding one of two second mechanical followers configured to move along each one of the second guide tracks. Movement of the two first mechanical followers along the first guide tracks and movement of the two second mechanical followers along the second guide tracks corresponds with adjustment of the angle of the seat pan relative to the fixed frame. The preceding subject matter of this paragraph characterizes example 8 of the present disclosure, wherein example 8 also includes the subject matter according to example 7, above.

The seat is suitable for use in a mass seating environment. The preceding subject matter of this paragraph characterizes example 9 of the present disclosure, wherein example 9 also includes the subject matter according to any of examples 1-8, above.

Also disclosed herein is a seat suitable for use in occupant mass seating. The seat comprises a seat base. The seat also comprises a fixed frame mounted to and above the seat base. The fixed frame comprises a frame front end and a frame rear end. The seat also comprises a seat pan positioned above the fixed frame and movably mounted to the fixed frame. The seat pan comprising a pan front end and a pan rear end. The seat further comprises at least one actuator comprising a first end, attached to the seat pan, and a second end, attached to the fixed frame. The at least one actuator is selectively operable to tilt the pan front end, relative to the pan rear end and the fixed frame, to adjust an angle of the seat pan relative to the fixed frame. Additionally, the seat comprises a seatback pivotably mounted to the frame rear end. The seatback is configured to pivot relative to the fixed frame between an upright position and a reclined position, inclusively. The preceding subject matter of this paragraph characterizes example 10 of the present disclosure.

The seatback is pivotably mounted to the frame rear end at a first pivot axis. The seat pan is pivotably mounted to the fixed frame at a second pivot axis. The pivot axis is parallel with a width of the seat pan. The pivot axis is closer to the pan rear end than the pan front end. The first pivot axis is offset from the second pivot axis. The preceding subject matter of this paragraph characterizes example 11 of the present disclosure, wherein example 11 also includes the subject matter according to example 10, above.

The seat pan moves independently of the seatback. The preceding subject matter of this paragraph characterizes example 12 of the present disclosure, wherein example 12 also includes the subject matter according to any one of examples 10-11, above.

The seatback is pivotably mounted to the frame rear end at a first pivot axis. The seat pan is pivotably mounted to the fixed frame at a second pivot axis. The pivot axis is parallel with a width of the seat pan. The pivot axis is closer to the pan rear end than the pan front end. The first pivot axis is collinear with the second pivot axis. The preceding subject matter of this paragraph characterizes example 13 of the present disclosure, wherein example 13 also includes the subject matter according to any one of examples 10-12, above.

The seat pan and the seatback are mechanically intercoupled to co-move relative to the fixed frame such that an angle defined between the seat pan and the seatback remains constant as the seat pan and the seatback are moved. The preceding subject matter of this paragraph characterizes example 14 of the present disclosure, wherein example 14 also includes the subject matter according to any one of examples 10-13, above.

The seatback is pivotably mounted to the frame rear end at a first pivot axis. The seat pan is pivotably mounted to the fixed frame at a second pivot axis. The first pivot axis is offset from the second pivot axis. The preceding subject matter of this paragraph characterizes example 15 of the present disclosure, wherein example 15 also includes the subject matter according to example 14, above.

The seatback is pivotably mounted to the frame rear end at a first pivot axis. The seat pan is pivotably mounted to the fixed frame at a second pivot axis. The first pivot axis is collinear with the second pivot axis. The preceding subject matter of this paragraph characterizes example 16 of the present disclosure, wherein example 16 also includes the subject matter according to example 14, above.

The seat further comprises an armrest. The at least one actuator is selectively operated by a button on the armrest. The preceding subject matter of this paragraph characterizes example 17 of the present disclosure, wherein example 17 also includes the subject matter according to any one of examples 10-16, above.

Further disclosed herein is a passenger seat for a mass transportation vehicle. The passenger seat comprises a seat base. The passenger seat also comprises a fixed frame mounted to and above the seat base. The fixed frame comprises a frame front end, a frame rear end, a left-side portion, and a right-side portion. The left-side portion is parallel to and spaced apart from the right-side portion. The passenger seat also comprises a first guide track in each of the left-side portion and the right-side portion of the fixed frame. The first guide track is closer to the frame front end of the fixed frame than the frame rear end. The first guide track extends at a downward angle from a first top end, in a direction towards the frame rear end, to a first bottom end.

The passenger seat also comprises a second guide track in each of the left-side portion and the right-side portion of the fixed frame. The second guide track is closer to the frame rear end than the frame front end. The second guide track extends at an upward angle from a second bottom end, in a direction towards the frame rear end, to a second top end. The passenger seat further comprises a seat pan positioned above the fixed frame. The seat pan comprises a pan front end and a pan rear end. The passenger seat further comprises at least one actuator comprising a first end, attached to the seat pan, and a second end, attached to the fixed frame. The at least one actuator is selectively operable to tilt the pan front end, relative to the pan rear end and the fixed frame, to adjust an angle of the seat pan relative to the fixed frame. Additionally, the passenger seat comprises a seatback pivotably mounted to the frame rear end. The seatback is configured to pivot relative to the fixed frame between an upright position and a reclined position, inclusively. The seat pan is attached to the first guide track in the left-side portion and the first guide track in the right-side portion by a corresponding one of two first mechanical followers configured to move along each one of the first guide tracks. The seat pan attached to the second guide track in the left-side portion and the second guide track in the right-side portion by a corresponding one of two second mechanical followers configured to move along each one of the second guide tracks. The preceding subject matter of this paragraph characterizes example 18 of the present disclosure.

The seat pan moves independently of the seatback. The preceding subject matter of this paragraph characterizes example 19 of the present disclosure, wherein example 19 also includes the subject matter according to example 18, above.

The seat pan and the seatback are mechanically intercoupled to co-move relative to the fixed frame such that an angle defined between the seat pan and the seatback remains constant as the seat pan and the seatback are moved. The preceding subject matter of this paragraph characterizes example 20 of the present disclosure, wherein example 20 also includes the subject matter according to example 18, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1A:
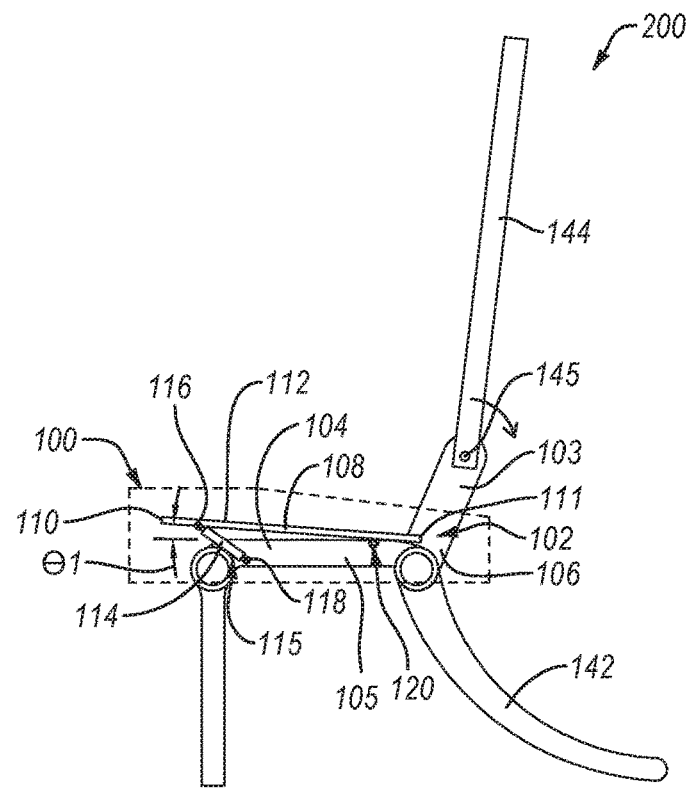
FIG. 1A is a schematic side view of a seat, with a seat pan assembly of the passenger seat in a first position, according to one or more examples of the present disclosure.
Figure 1B:
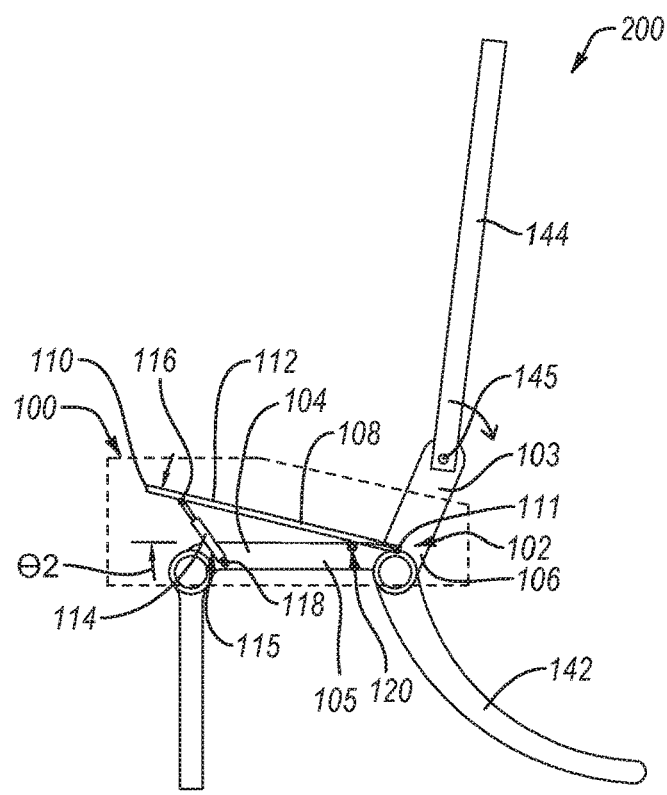
FIG. 1B is a schematic side view of the passenger seat of FIG. 1A with the seat pan assembly in a second position, according to one or more examples of the present disclosure.

Referring to FIGS. 1A and 1B, and according to some examples, a passenger seat 200 for a mass seating environment is shown. The passenger seat 200 includes a set pan assembly 100, a seat base 142, and a seatback 144. The seat pan assembly 100 includes a fixed frame 102, a seat pan 108, and at least one actuator 114 connected to the fixed frame 102 and to the seat pan 108. In some examples, the passenger seat 200 is a stand-alone seat. In other examples, the passenger seat 200 is one seat in a row of seats and the passenger seat 200 may share common elements, such as the seat base 142 or armrests with other passenger seats in the row. The passenger seat 200 may be covered with a material, such as foam, upholstery, synthetic material, leather, or other material for added comfort to a passenger sitting in the passenger seat 200, as well as, the aesthetics of the passenger seat 200.

The passenger seat 200 may be used in any mass seating environment, such as a mass transportation vehicle or a mass gathering locale, such as a theatre, convention hall, and the like. In certain examples, the mass transportation vehicle is one of a bus, rail or train system, watercraft (e.g., ferry), or aircraft. As used herein, the passenger seat 200 will be described in the context of an aircraft, however, it should be understood that the passenger seat 200 could be used in any mass seating environment. Accordingly, as used herein, the term passenger seat can be used interchangeably with occupant seat depending on the application in which the seat is used. The passenger seat 200 is particularly useful in an environment with limited space between rows of seats, such as economy or other seating on an aircraft, as the articulation of the seat pan assembly 100 can be accomplished in a small area with little to no change to the intervening space existing between the front of a passenger's seat and the back of the seat in front of the passenger. In other words, as the seat pan is tilted by a passenger, as described below, there is little to no change in the forward legroom space for the passenger in the passenger seat 200.

The seat pan assembly 100 includes a fixed frame 102. The fixed frame 102 has a frame front end 104 and a frame rear end 106. The fixed frame 102 is mounted to the seat base 142 and is positioned above the seat base 142. In one example, the frame front end 104 and the frame rear end 106 are spaced apart from each other and form a fixed frame 102 that is substantially horizontal. In another example, the frame front end 104 and the frame rear end 106 are spaced apart from each other and are nonplanar, as shown in FIG. 1A. The fixed frame 102 has a substantially horizontal portion 105 and an upward extending portion 103, such that the fixed frame 102 forms an "L" shape. The frame rear end 106 is along the upward extending portion 103 of the fixed frame 102. The seatback 144 is pivotably mounted to the upward extending portion 103 at the frame rear end 106. Accordingly, the seatback 144 and the upward extending portion 103 of the fixed frame 102 together create a back of the passenger seat 200.

The seat pan assembly 100 also includes a seat pan 108. The seat pan 108 is positioned above the fixed frame 102 and is movably mounted to the fixed frame 102. The seat pan 108 has a pan front end 110 and a pan rear end 111. The seat pan 108 is pivotably mounted to the fixed frame 102 at a pivot axis 120. The pivot axis 120 is parallel with a width W of the seat pan 108. In other words, the pivot axis 120 tilts the seat pan 108 uniformly along the pan front end 110 of the seat pan 108. In one example, the pivot axis 120 is closer to the pan rear end 111 than the pan front end 110. Accordingly, as the seat pan 108 is pivoted about the pivot axis 120, the pan front end 110 is tilted at an angle above the frame front end 104 of the fixed frame 102 and the pan rear end 111 is tilted at an angle below the frame rear end 106 of the fixed frame 102. In other examples, such as FIG. 2, the pivot axis is located at the pan rear end 111. Therefore, as the seat pan 108 is pivoted about the pivot axis 120, the pan front end 110 is tilted at an angle above the frame front end 104 of the fixed frame 102 and the pan rear end 111 is translationally fixed with respect to the fixed frame 102.

The seat pan assembly 100 may be formed of materials including, but not limited to, metallic materials, such as aluminum or stainless steel, composite materials, or other similar materials. In some examples, the seat pan 108 and the fixed frame 102 are formed of the same materials. In other examples, the seat pan 108 and the fixed frame 102 are formed of different materials.

The actuator 114, or each one of multiple actuators 114, is selectively operable to tilt the seat pan 108 relatively to the fixed frame 102. The actuator 114 has a first end 116, attached to the seat pan 108 and a second end 118, attached to the fixed frame 102. The actuator 114 is used to tilt the pan front end 110 relative to the pan rear end 111 and the fixed frame 102. Therefore, adjusting the angle of the seat pan 108 relative to the fixed frame 102. The actuator may be attached to the seat pan 108 at any location along the width W of the seat pan 108. Additionally, multiple actuators 114 may be attached to the seat pan 108 and work in unison to adjust the angle of the seat pan 108 relative to the fixed frame 102. As shown in FIG. 1A, the seat pan 108 is at a first position 112 in which the seat pan 108 defines an angle θ1 relative to the horizontal portion 105 of the fixed frame 102. The first position 112 is the natural position of the seat pan 108 relative to the fixed frame 102 without the actuator 114 being operated. The first position 112 may be substantially horizontal, such that the angle θ1 is approximately zero or the angle θ1 is less than 3-degrees.

The actuator 114 is operated to tilt the seat pan 108 to a second position 113 in which the seat pan 108 defines an angle θ2 relative to the horizontal portion 105 of the fixed frame 102, as shown in FIG. 1B. The angle θ2 is greater than the angle θ1. In the second position 113, a passenger sitting in the passenger seat 200 would have their legs elevated and would be held more securely in the space between the seat pan 108 and the seatback 144. The elevated position of the passenger's legs between the seat pan 108 and the seatback 144 help prevent the passenger from sliding forward in the passenger seat 200, relieving the need of the passenger to reposition themselves in the seat during a flight and increasing the passenger's comfort. Accordingly, in moving from the first position 112 in FIG. 1A to the second position 113 in FIG. 1B, the pan front end 110 of the seat pan 108 tilts to adjust the angle of the seat pan 108 relative to the fixed frame 102 for the comfort of a seated passenger.

The angle of the seat pan 108 relative to the fixed frame 102 is adjustable between the first position 112 and the second position 113. In one example, the angle θ1 when in the first position 112 is 0 degrees and the angle θ2 when in the second position 113 is from about 15 to about 45 degrees, or from about 17 to about 40 degrees, or from about 20 to about 35 degrees. In another example, the angle θ1 when in the first position 112 is 0 degrees and the angle θ2 when in the second position 113 is up to 45 degrees. In yet another example, the angle θ1 when in the first position 112 is between 0 degrees and 3 degrees and the angle θ2 when in the second position 113 is between 20 degrees and 45 degrees. The seat pan 108 may be adjustable from the angle θ1 of the first position 112 to only the angle θ2 of the second position 113. Alternatively, the seat pan 108 may be able to adjust to any angle between, and including, the angle θ1 of the seat pan 108 when in the first position 112 and the angle θ2 of the seat pan 108 when in the second position 113.

Figure 3A:
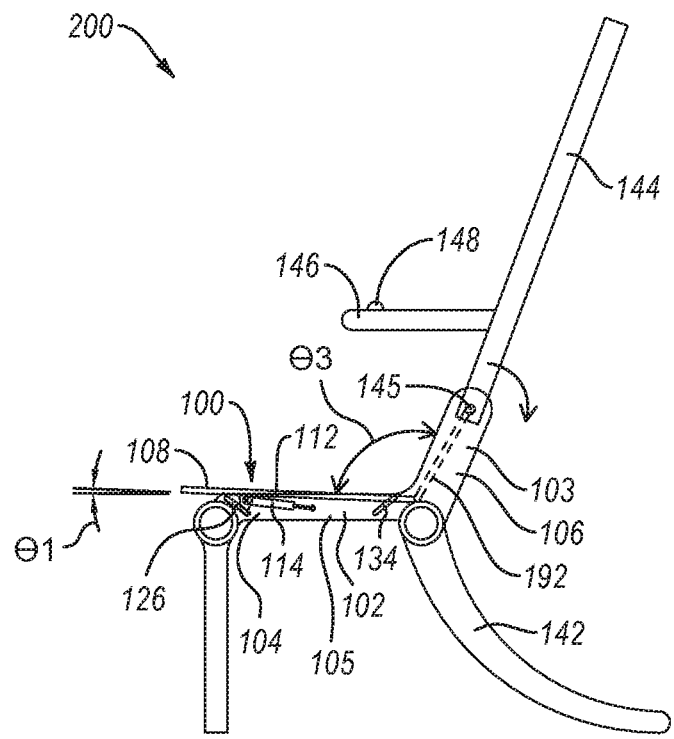
FIG. 3A is a schematic side view of a passenger seat, with a seat pan assembly of the passenger seat in a first position, according to one or more examples of the present disclosure.

The actuator 114 may be a pneumatic spring 115 or other suitable releasably locking device. In some examples, the actuator 114 is an electrically powered actuator controlled by one or more buttons available to a seated passenger. As shown in FIG. 3A, a manual button 148 that is used to control the actuator 114 is on an armrest 146. The actuator 114 may be controlled by dedicated manual buttons or may be controlled by virtual buttons, such as a touchpad seating control device. In other examples, the actuator 114 is manually powered by a manual device connected to the actuator 114, such as a manual device under the passenger seat 200 a passenger can adjust to operate the actuator 114. The actuator 114 may be used to lock the seat pan 108 at any angle relative to the fixed frame 102 between the first position 112 and the second position 113.

The passenger seat 200 includes a seat base 142. The seat base 142 is a rigid base that is secured to the deck of the aircraft. Accordingly, the seat base 142 is stationary with respect to the deck of the aircraft as the aircraft travels. In one example, the seat base 142 has upright leg assemblies. Only one leg assembly is shown in the figures but it should be understood that any number of leg assemblies can be arranged in a seating row to support one or multiple passenger seats 200.

The passenger seat 200 also includes a seatback 144. The seatback 144 is pivotably mounted to the frame rear end 106 and is configured to pivot relative to the fixed frame 102 between an upright position and reclined positions. The seatback 144 is pivotably mounted at a first pivot axis 145. In some examples, particularly when the passenger seat 200 is used in mass transportation with limited space between rows, the seatback 144 has a limited angle of recline. In other examples, the seatback 144 may recline to a relatively horizontal sleeping position. Pivoting of the seatback 144 may be controlled by an actuator. Additionally, the seatback 144 may be locked at any angle between the upright position and full reclined position to allow for an unlimited range of adjustability.

Figure 2:
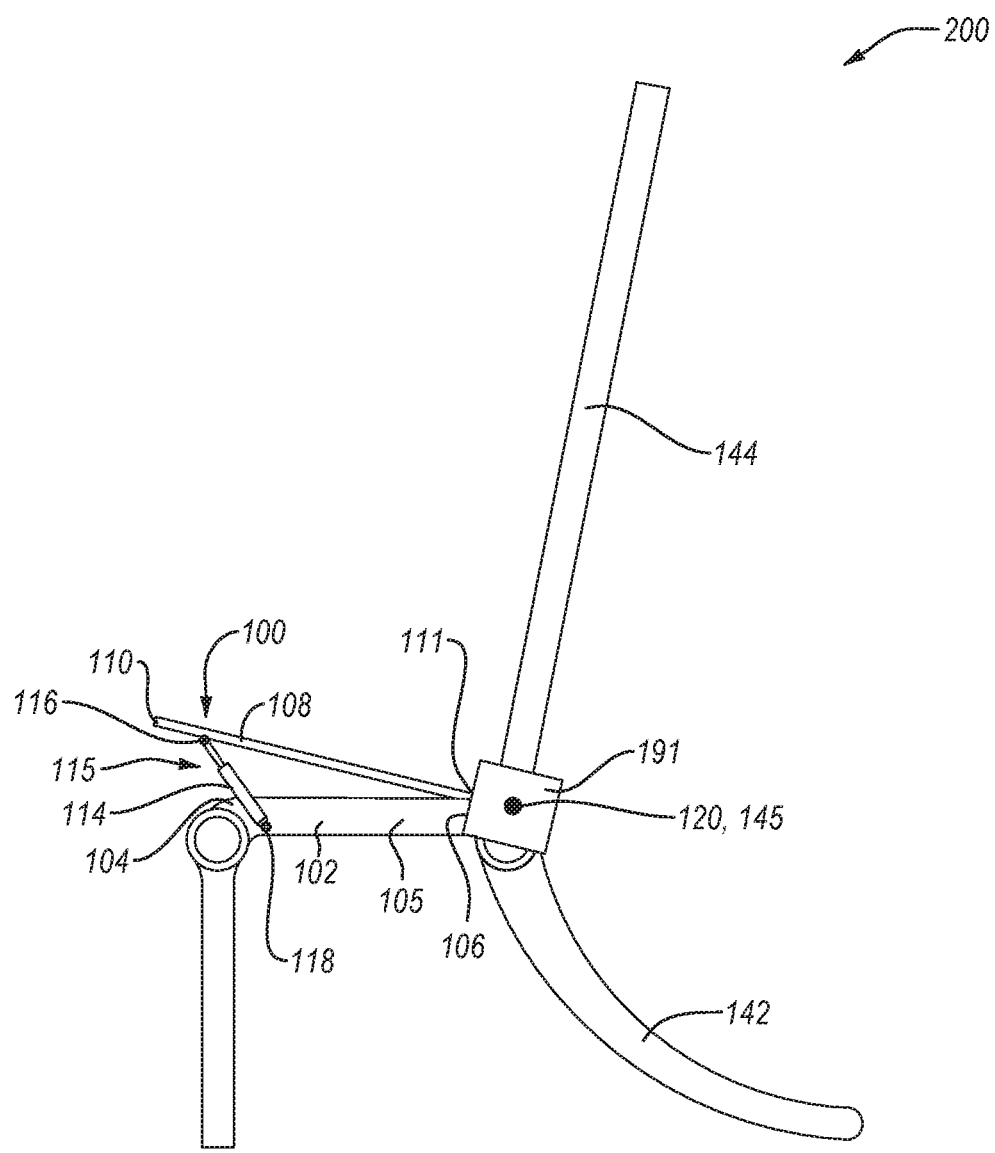
FIG. 2 is a schematic side view of a passenger seat with a seat pan assembly, according to one or more examples of the present disclosure.

According to some examples the seatback 144 is configured to move independently of the seat pan 108, which is pivotably mounted to the fixed frame 102 at a second pivot axis 120. Accordingly, the seatback 144 may be configured to recline, however, the seatback 144 is not required to recline. In one example, the first pivot axis 145 is offset from the second pivot axis 120, such as in FIG. 1A, where the first pivot axis 145 is at the frame rear end 106 of the upward extending portion 103 of the fixed frame 102 and the second pivot axis 120 is pivotably mounted to the substantially horizontal portion 105 of the fixed frame 102. In other examples, as shown in FIG. 2, the first pivot axis 145 is collinear with the second pivot axis 120. For example, the first pivot axis 145 and the second pivot axis 120 are both along the substantially horizontal portion 105 of the fixed frame 102 but move independently of each other. The first pivot axis 145 and the second pivot axis 120 may be spaced apart from each other or may share the same axis.

In other examples, the seatback 144 and the seat pan 108 are mechanically intercoupled to co-move relative to the fixed frame 102. In other words, the angle defined between the seatback 144 and the seat pan 108 remains constant as the seat pan 108 and the seatback 144 are moved. In some examples, the first pivot axis 145 is spaced apart from the second pivot axis 120 and may be offset or collinear from each other. In other examples, the first pivot axis 145 and the second pivot axis 120 share the same axis. A single actuator 114 may be used to co-move the seatback 144 and seat pan 108 or multiple actuators may be employed.

As shown in FIG. 2, the first pivot axis 145 and the second pivot axis 120 share the same axis at the frame rear end 106 of the fixed frame 102. An actuator 114 is attached to the seat pan at a first end 116 of the actuator 114 and attached to the fixed frame 102 at a second end 118 of the actuator 114. The actuator 114 is selectively operable to tilt the pan front end 110 and to recline the seatback 144. In other words, the seatback 144 and the seat pan 108 co-move when the actuator 114 is operated. The seatback 114 and the seat pan 108 can be co-movably coupled by a coupling mechanism 191, which can be any of various couplers, such as brackets, fasteners, bearings, etc., known in the art. However, it is recognized that the seatback 144 and the seat pan 108 can share the same axis of rotation but be independently rotatable relative to each other.

Figure 3B:
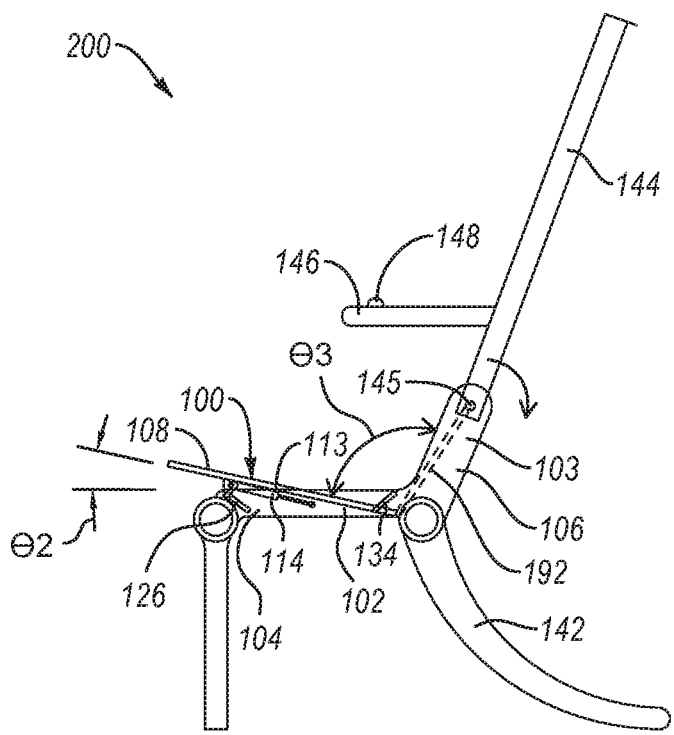
FIG. 3B is a schematic side view of the passenger seat of FIG. 3A, with the seat pan assembly in a second position, according to one or more examples of the present disclosure.

According to some examples, as shown in FIG. 3A and FIG. 3B, the passenger seat 200 has a fixed frame 102 with guide tracks. The fixed frame 102 has a first guide track 126 and a second guide track 134. In some examples, the first guide track 126 is located in the fixed frame 102 closer to the frame front end 104 of the fixed frame 102 than the frame rear end 106. In other examples, the first guide track 126 is located at any location in the fixed frame 102 before the second guide track 134.

Figure 4:
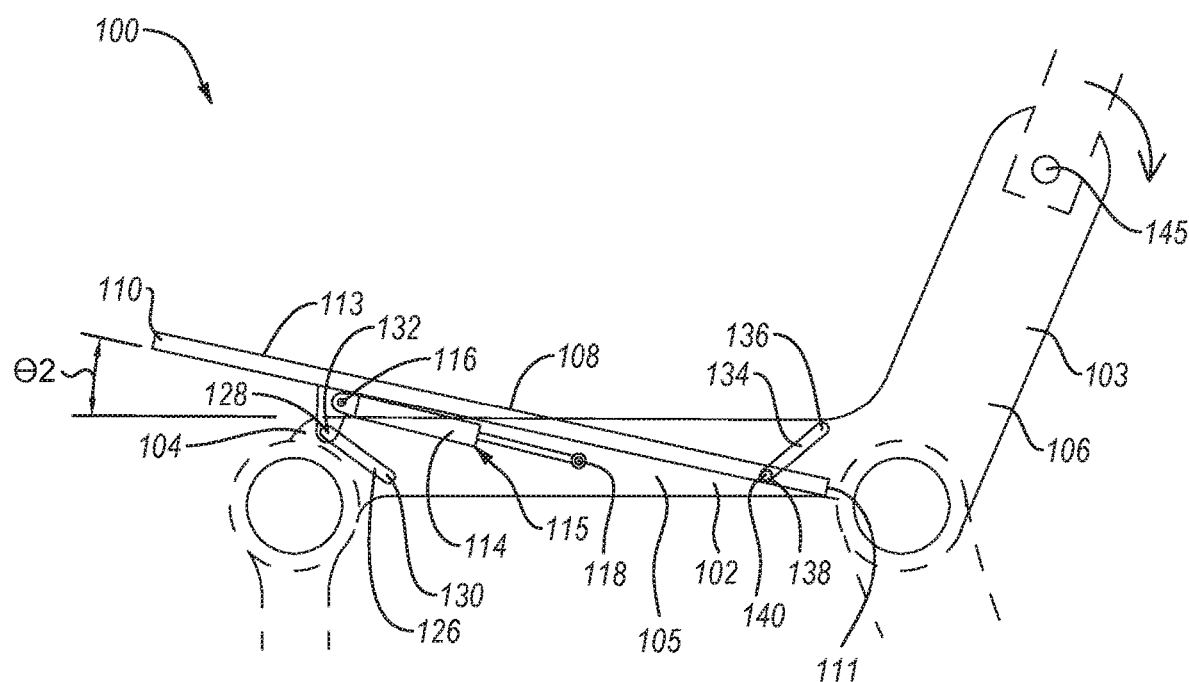
FIG. 4 is a schematic side view of a seat pan assembly, according to one or more examples of the present disclosure.

Referring further to FIG. 4, the first guide track 126 is a slot in the fixed frame 102 that extends at a downward angle in a direction towards the frame rear end 106 from a first top end 128 to a first bottom end 130. The seat pan 108 is attached to the first guide track 126 by a first mechanical follower 132 that is configured to move along the first guide track 126. Likewise, the second guide track 134 is a slot in the fixed frame 102 that extends at an upward angle in a direction towards the frame rear end 106 from a second bottom end 138 to a second top end 136. The seat pan 108 is attached to the second guide track 134 by a second mechanical follower 140.

Movement of the first mechanical follower 132 along the first guide track 126 and movement of the second mechanical follower 140 along the second guide track 134 adjusts the angle of the set pan 108 relative to the fixed frame 102. For example, the first mechanical follower 132 is at the first bottom end 130 and the second mechanical follower 140 is at the second top end 136. As the actuator 114 is operated, the first mechanical follower 132 moves along the first guide track 126 to the first top end 128 and the second mechanical follower 140 moves along the second guide track 134 to the second bottom end 138. Accordingly, the pan front end 110 of the seat pan 108 is tilted to adjust the angle of the seat pan 108 relative to the fixed frame 102, as shown in FIG. 4. In some examples, the actuator 114 is operated to move the seat pan 108 from a first position 112 (see, e.g., FIG. 3A), associated with the angle $\theta 1$ as defined above, to a second position 113 (see, e.g., FIG. 3B), associated with the angle $\theta 2$ as defined above. In other examples, the actuator 114 is operated to adjust the angle of the seat pan 108 to any angle by locking the actuator 114 while the first mechanical follower 132 and second mechanical follower 140 are at any location along the first guide track 126 and second guide track 134, respectively.

A seat pan assembly 100, according to some examples, is shown in FIG. 4. As the seat pan 108 tilts from a substantial horizontal position to an angled position, the pan front end 110 of the seat pan 108 moves forward in a horizontal plane. However, the forward movement of the seat pan 108 is minimal and therefore there is little change to the intervening space between the front of the passenger's seat and the seat in front of the passenger. Accordingly, the seat pan assembly 100 is useful in aircrafts with limited space between rows of seats while adding to the comfort of a passenger.

Figure 5:
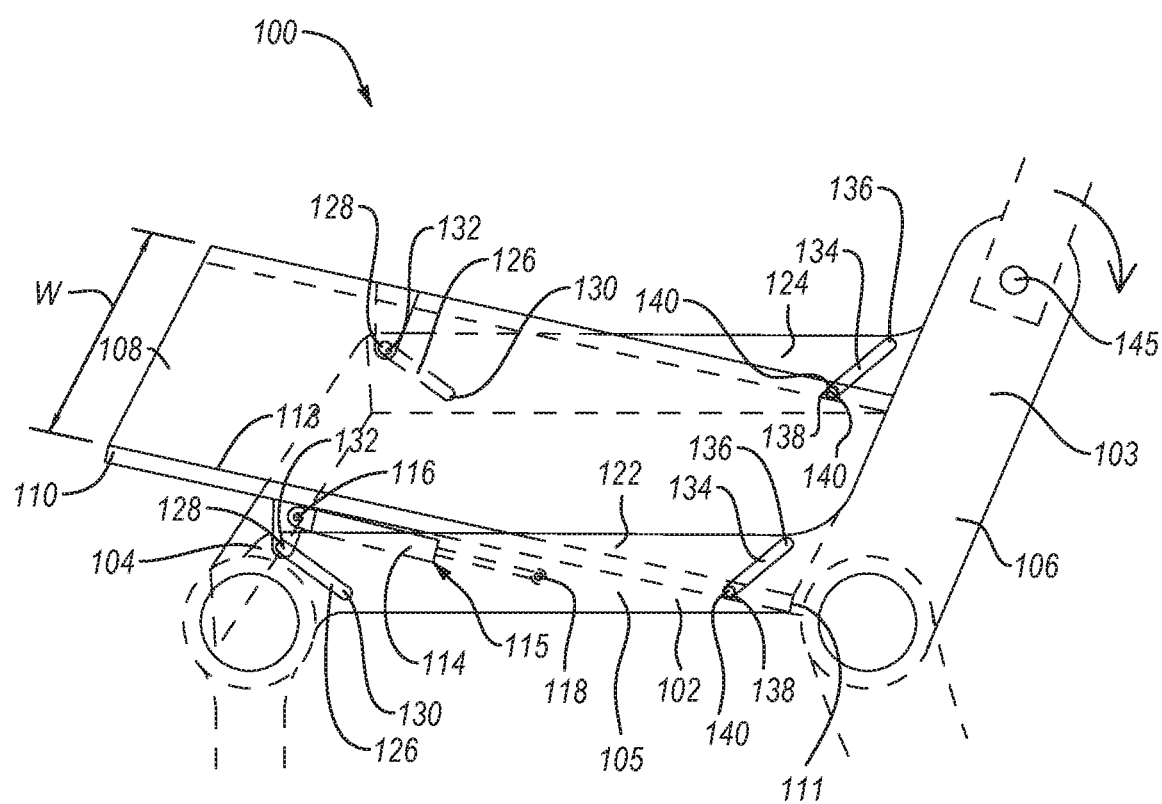
FIG. 5 is a schematic perspective and enlarged view of a seat pan assembly, according to one or more examples of the present disclosure.

As shown in FIG. 5, in some examples, the fixed frame 102 has a left-side portion 122 and a right-side portion 124. The left-side portion 122 and the right-side portion 124 are parallel to each other from the frame front end 104 to the frame rear end 106. Additionally, the left-side portion is spaced apart from the right-side portion 124 by at least of width W of the seat pan 108. In some examples, the frame front end 104, frame rear end 106, left-side portion 122, and right-side portion 124 may be integrally formed and serve as the primary structure of the fixed frame 102.

A first guide track 126 is in each of the left-side portion 122 and the right-side portion 124 of the fixed frame 102. The seat pan 108 is attached to the first guide track 126 in the left-side portion 122 and the first guide track 126 in the right-side portion 124 by a corresponding one of two first mechanical followers 132. The first mechanical followers 132 may be linked together or separate. Regardless of whether the two first mechanical followers 132 are linked or separate, both of the first mechanical followers 132 move simultaneously along the first guide tracks 126. Similarly, a second guide track 134 is in each of the left-side portion 122 and the right-side portion 124 of the fixed frame 102. The seat pan 108 is attached to the second guide track 134 in the left-side portion 122 and the second guide track 134 in the right-side portion 124 by a corresponding one of two second mechanical followers 140. The second mechanical followers 132 may be linked together or separate but move simultaneously along the second guide tracks 126. The first mechanical followers 132 and second mechanical followers 140 are configured to move along each of the first guide tracks 126 and second guide tracks 134, respectively, at the same rate.

According to some examples, the seatback 144 is configured to move independently of the seat pan 108. The seatback 144 may be pivotably mounted to the fixed frame 102 at the second pivot axis 145, which may or may not be offset from the substantially horizontal portion 105 of the fixed frame 102. In other examples, as shown in FIGS. 3A and 3B, the seatback 144 and the seat pan 108 are mechanically intercoupled by an intercoupling assembly 192, to co-move relative to the fixed frame 102. In other words, an angle $\theta 3$ (see, e.g., FIGS. 3A and 3B) defined between the seatback 144 and the seat pan 108 remains constant as the seatback 144 is reclined or raised because the seat pan 108 tilts upward in a synchronized manner as the seatback 144 reclines. Therefore, as the seatback 144 is reclined, the seat pan 108 is tilted from a first position 112 to a second position 113 to maintain the angle $\theta 3$ between the seat pan 108 and the seatback 144. In this manner, a passenger will not slide forwardly along the seat pan 108 when the seatback 144 is reclined due to the upward tilt of the seat pan 108. A single actuator 114 may be used to co-move the seatback 144 and seat pan 108 or multiple actuators may be employed. In some examples, the intercoupling assembly 192 includes multiple linkages arranged to actuate the reclining of the seatback 114 as the seat pan 108 is tilted, or vice versa.

Figure 6A:
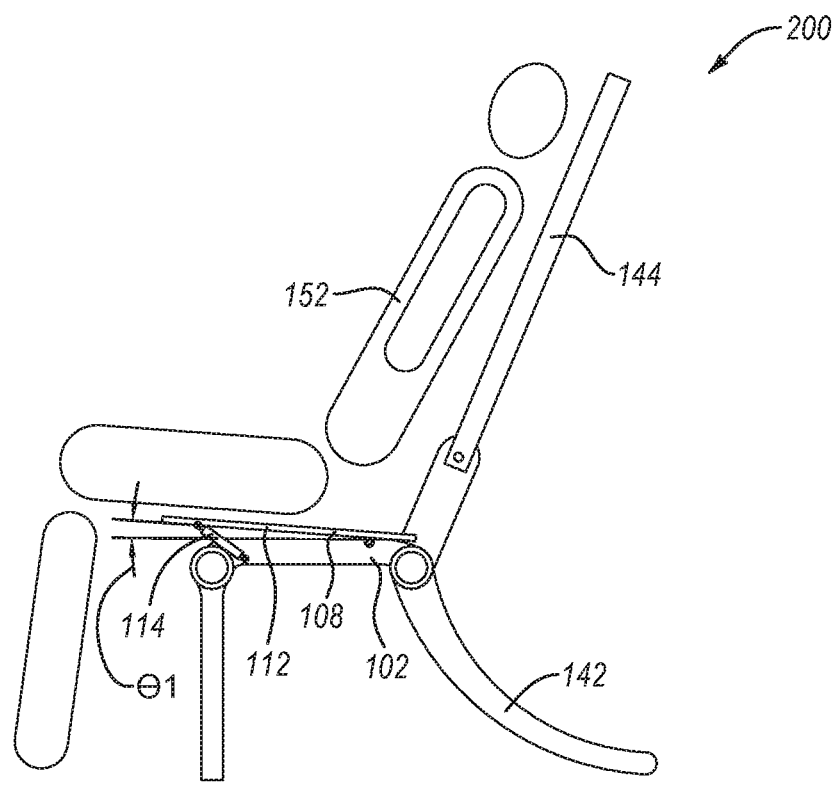
FIG. 6A is a schematic side view of a passenger seated in a passenger seat in a reclining position, with a seat pan assembly in a first position, according to one or more examples of the present disclosure.
Figure 6B:
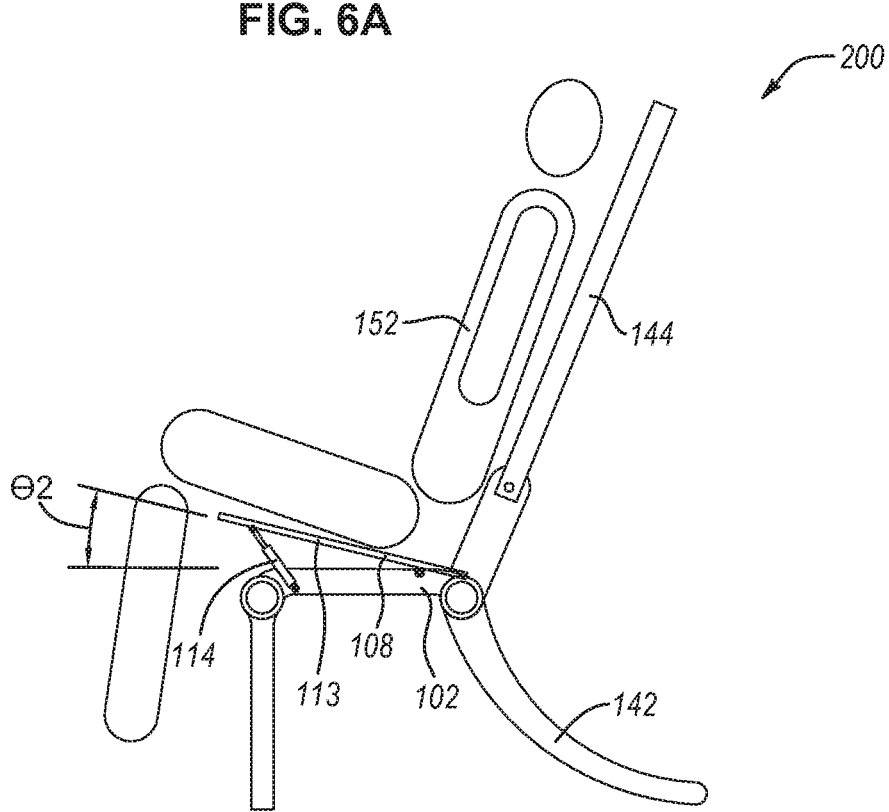
FIG. 6B is a schematic side view of a passenger seated in a passenger seat in a reclining position, with a seat pan assembly in a second position, according to one or more examples of the present disclosure.

According to FIGS. 6A and 6B, a passenger 152 is seated in a passenger seat 200. The passenger seat 200, as shown in FIG. 6A, has a seatback 144 in a reclined position and the seat pan 108 in a first position 112, in which the seat pan 108 defines an angle $\theta 1$ relative to the fixed frame 102. Due to the position of the seatback 144 and the seat pan 108, the passenger 152 may slide forwardly along the seat pan 108. Accordingly, the head and upper back of the passenger 152 are supported by, or in close proximity to, the reclined seatback 144. However, the lower back of the passenger 152 may not be supported by, or in close proximity to, the reclined seatback 144, as the passenger may not be able to comfortably push their back against or near the seatback 144. As shown in FIG. 6B, the passenger seat 200 has a seatback 144 in a reclined position and the seat pan 108 in a second position 113, in which the seat pan 108 defines an angle $\theta 2$ relative to the fixed frame 102. In the second position 113, the passenger 152 is held more securely in the space between the seat pan 108 and the seatback 144. The lower back of the passenger 152 may be positioned against, or in close proximity to, the seatback 144 thereby decreasing the space between the lower back of the passenger 152 and the seatback 144 from a passenger seated in the first position 112. Accordingly, the passenger 152 may experience increased back support and overall comfort.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A seat pan assembly for a seat, the seat pan assembly comprising:
    a fixed frame comprising a frame front end, a frame rear end, a left-side portion, and a right-side portion, and wherein the left-side portion is parallel to and spaced apart from the right-side portion;
    a first guide track in each one of the left-side portion and the right-side portion of the fixed frame, wherein the first guide track is closer to the frame front end of the fixed frame than the frame rear end;
    a second guide track in each one of the left-side portion and the right-side portion of the fixed frame, wherein the second guide track is closer to the frame rear end than the frame front end;
    a seat pan positioned above the fixed frame and movably mounted to the fixed frame, wherein the seat pan comprises a pan front end and a pan rear end, wherein the first guide track extends linearly at a downward angle from a first top end, in a direction towards the frame rear end, to a first bottom end, and wherein the second guide track extends linearly at an upward angle from a second bottom end, in a direction towards the frame rear end, to a second top end, and wherein the second bottom end of the second guide track is positioned below the first top end of the first guide track; and
    at least one actuator comprising a first end, attached to the seat pan, and a second end, attached to the fixed frame, wherein the at least one actuator is selectively operable to tilt the pan front end, relative to the pan rear end and the fixed frame, to adjust an angle of the seat pan relative to the fixed frame;
    wherein:
        the seat pan is attached to the first guide track in the left-side portion and the first guide track in the right-side portion by a corresponding one of two first mechanical followers each configured to move along a respective one of the first guide tracks; and
        the seat pan is attached to the second guide track in the left-side portion and the second guide track in the right-side portion by a corresponding one of two second mechanical followers each configured to move along a respective one of the second guide tracks.

2. The seat pan assembly of claim 1, wherein:
    the seat pan is pivotably mounted to the fixed frame at a pivot axis;

the pivot axis is parallel with a width of the seat pan; and
the pivot axis is closer to the pan rear end than the pan front end.

3. The seat pan assembly of claim 2, wherein the pivot axis is located at the pan rear end.

4. The seat pan assembly of claim 1, wherein the angle of the seat pan relative to the fixed frame is adjustable between a first position and a second position.

5. The seat pan assembly of claim 1, wherein the at least one actuator is selectively operable to tilt the pan front end, relative to the pan rear end and the fixed frame, to adjust the angle of the seat pan relative to the fixed frame to any angle between a first position and a second position.

6. The seat pan assembly of claim 1, wherein the at least one actuator is a pneumatic spring.

7. The seat pan assembly of claim 1,
wherein movement of the two first mechanical followers along the first guide tracks and movement of the two second mechanical followers along the second guide tracks corresponds with adjustment of the angle of the seat pan relative to the fixed frame.

8. The seat pan assembly of claim 1, wherein the seat is suitable for use in a mass seating environment.

9. The seat pan assembly of claim 1, wherein the seat pan assembly is suitable for use in an aircraft seat.

10. A passenger seat for a mass transportation vehicle, comprising:
a seat base;
a fixed frame mounted to and above the seat base, wherein the fixed frame comprises a frame front end, a frame rear end, a left-side portion, and a right-side portion, and wherein the left-side portion parallel to and spaced apart from the right-side portion;
a first guide track in each of the left-side portion and the right-side portion of the fixed frame, wherein the first guide track is closer to the frame front end of the fixed frame than the frame rear end, and wherein the first guide track extends linearly at a downward angle from a first top end of the first guide track, in a direction towards the frame rear end, to a first bottom end of the first guide track;
a second guide track in each of the left-side portion and the right-side portion of the fixed frame, wherein the second guide track is closer to the frame rear end than the frame front end, and wherein the second guide track extends linearly at an upward angle from a second bottom end of the second guide track, in a direction towards the frame rear end, to a second top end of the second guide track;
a seat pan positioned above the fixed frame, wherein the seat pan comprises a pan front end and a pan rear end;
at least one actuator comprising a first end, attached to the seat pan, and a second end, attached to the fixed frame, wherein the at least one actuator is selectively operable to tilt the pan front end, relative to the pan rear end and the fixed frame, to adjust an angle of the seat pan relative to the fixed frame; and
a seatback pivotably mounted to the frame rear end, wherein the seatback is configured to pivot relative to the fixed frame between an upright position and a reclined position, inclusively;
wherein:
the seat pan is attached to the first guide track in the left-side portion and the first guide track in the right-side portion by a corresponding one of two first mechanical followers each configured to move along a respective one of the first guide tracks;

the seat pan attached to the second guide track in the left-side portion and the second guide track in the right-side portion by a corresponding one of two second mechanical followers each configured to move along a respective one of the second guide tracks; and
the seat pan moves independently of the seatback.

11. The passenger seat of claim 10, wherein:
the seatback is pivotably mounted to the frame rear end at a first pivot axis;
the seat pan is pivotably mounted to the fixed frame at a second pivot axis;
the pivot axis is parallel with a width of the seat pan;
the pivot axis is closer to the pan rear end than the pan front end; and
the first pivot axis is offset from the second pivot axis.

12. The passenger seat of claim 10, wherein:
the seatback is pivotably mounted to the frame rear end at a first pivot axis;
the seat pan is pivotably mounted to the fixed frame at a second pivot axis;
the pivot axis is parallel with a width of the seat pan;
the pivot axis is closer to the pan rear end than the pan front end; and
the first pivot axis is collinear with the second pivot axis.

13. The passenger seat of claim 10 wherein:
the seatback is pivotably mounted to the frame rear end at a first pivot axis;
the seat pan is pivotably mounted to the fixed frame at a second pivot axis; and
the first pivot axis is offset from the second pivot axis.

14. The passenger seat of claim 10, wherein:
the seatback is pivotably mounted to the frame rear end at a first pivot axis;
the seat pan is pivotably mounted to the fixed frame at a second pivot axis; and
the first pivot axis is collinear with the second pivot axis.

15. The passenger seat of claim 10, further comprising an armrest, wherein the at least one actuator is selectively operated by a button on the armrest.

16. The passenger seat of claim 10, wherein the passenger seat is suitable for use in an aircraft.

17. The passenger seat of claim 10, wherein the at least one actuator is a pneumatic spring.

18. The passenger seat of claim 10, wherein the second bottom end of the second guide track is positioned below the first top end of the first guide track.

19. A passenger seat for a mass transportation vehicle, comprising:
a seat base;
a fixed frame mounted to and above the seat base, wherein the fixed frame comprises a frame front end, a frame rear end, a left-side portion, and a right-side portion, and wherein the left-side portion parallel to and spaced apart from the right-side portion;
a first guide track in each of the left-side portion and the right-side portion of the fixed frame, wherein the first guide track is closer to the frame front end of the fixed frame than the frame rear end, and wherein the first guide track extends linearly at a downward angle from a first top end of the first guide track, in a direction towards the frame rear end, to a first bottom end of the first guide track;
a second guide track in each of the left-side portion and the right-side portion of the fixed frame, wherein the second guide track is closer to the frame rear end than the frame front end, and wherein the second guide track extends linearly at an upward angle from a second bottom end of the second guide track, in a direction towards the frame rear end, to a second top end of the second guide track, and wherein the second bottom end of the second guide track is positioned below the first top end of the first guide track;

a seat pan positioned above the fixed frame, wherein the seat pan comprises a pan front end and a pan rear end;

at least one actuator comprising a first end, attached to the seat pan, and a second end, attached to the fixed frame, wherein the at least one actuator is selectively operable to tilt the pan front end, relative to the pan rear end and the fixed frame, to adjust an angle of the seat pan relative to the fixed frame; and a seatback pivotably mounted to the frame rear end, wherein the seatback is configured to pivot relative to the fixed frame between an upright position and a reclined position, inclusively;

wherein:
- the seat pan is attached to the first guide track in the left-side portion and the first guide track in the right-side portion by a corresponding one of two first mechanical followers each configured to move along a respective one of the first guide tracks;
- the seat pan attached to the second guide track in the left-side portion and the second guide track in the right-side portion by a corresponding one of two second mechanical followers each configured to move along a respective one of the second guide tracks; and
- the seat pan and the seatback are mechanically intercoupled to co-move relative to the fixed frame such that an angle defined between the seat pan and the seatback remains constant as the seat pan and the seatback are moved.

20. The passenger seat of claim 19, wherein the passenger seat is suitable for use in an aircraft.

\* \* \* \* \*